(12) United States Patent
Nellitheertha et al.

(10) Patent No.: US 9,852,299 B2
(45) Date of Patent: Dec. 26, 2017

(54) PROTECTION SCHEME FOR REMOTELY-STORED DATA

(71) Applicant: INTEL CORPORATION, Santa Clara, CA (US)

(72) Inventors: Hariprasad Nellitheertha, Bangalore (IN); Deepak S., Bangalore (IN); Thanunathan Rangarajan, Bangalore (IN); Anil S. Keshavamurthy, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/358,789

(22) PCT Filed: Sep. 27, 2013

(86) PCT No.: PCT/US2013/062067
§ 371 (c)(1),
(2) Date: May 16, 2014

(87) PCT Pub. No.: WO2015/047285
PCT Pub. Date: Apr. 2, 2015

(65) Prior Publication Data
US 2015/0220745 A1   Aug. 6, 2015

(51) Int. Cl.
*G06F 21/60* (2013.01)
*G06F 15/16* (2006.01)
(Continued)

(52) U.S. Cl.
CPC ........ *G06F 21/602* (2013.01); *G06F 9/45558* (2013.01); *G06F 15/16* (2013.01);
(Continued)

(58) Field of Classification Search
None
See application file for complete search history.

(56) References Cited

U.S. PATENT DOCUMENTS 7,428,636 B1    9/2008  Waldspurger et al.
8,694,781 B1 *  4/2014  Griffin et al. ................. 713/168
(Continued)

OTHER PUBLICATIONS

International Search Report and Written Opinion received for PCT Patent Application No. PCT/US2013/062067, dated Jun. 23, 2014, 11 Pages.
(Continued)

*Primary Examiner* — Benjamin Lanier
(74) *Attorney, Agent, or Firm* — Grossman, Tucker, Perreault & Pfleger, PLLC (57) ABSTRACT

The present disclosure is directed to a protection scheme for remotely-stored data. A system may comprise, for example, at least one device including at least one virtual machine (VM) and a trusted execution environment (TEE). The TEE may include an encryption service to encrypt or decrypt data received from the at least one VM. In one embodiment, the at least one VM may include an encryption agent to interact with interfaces in the encryption service. For example, the encryption agent may register with the encryption service, at which time an encryption key corresponding to the at least one VM may be generated. After verifying the registration of the encryption agent, the encryption service may utilize the encryption key corresponding to the at least one VM to encrypt or decrypt data received from the encryption agent. The encryption service may then return the encrypted or decrypted data to the encryption agent.

18 Claims, 7 Drawing Sheets

(51) Int. Cl.
  *G06F 21/62* (2013.01)
  *G06F 9/455* (2006.01)
  *G06F 21/53* (2013.01)

(52) U.S. Cl.
  CPC .............. *G06F 21/53* (2013.01); *G06F 21/60* (2013.01); *G06F 21/6218* (2013.01); *G06F 2009/45587* (2013.01)

(56) References Cited

U.S. PATENT DOCUMENTS

| | | | |
|---|---|---|---|
| 8,782,403 B1* | 7/2014 | Satish et al. | 713/165 |
| 2002/0019935 A1* | 2/2002 | Andrew et al. | 713/165 |
| 2005/0198633 A1* | 9/2005 | Lantz | G06F 9/45558 718/1 |
| 2007/0056039 A1* | 3/2007 | Khosravi et al. | 726/24 |
| 2008/0114985 A1* | 5/2008 | Savagaonkar et al. | 713/176 |
| 2009/0187769 A1* | 7/2009 | Camiel | 713/189 |
| 2010/0146267 A1* | 6/2010 | Konetski et al. | 713/164 |
| 2010/0153749 A1 | 6/2010 | Sakai | |
| 2011/0179412 A1* | 7/2011 | Nakae et al. | 718/1 |
| 2011/0213856 A1* | 9/2011 | Moroney | G06F 21/10 709/217 |
| 2011/0293097 A1 | 12/2011 | Maino et al. | |
| 2011/0302415 A1 | 12/2011 | Ahmad et al. | |
| 2011/0314303 A1* | 12/2011 | Shevchenko | G06F 9/30178 713/190 |
| 2012/0290850 A1 | 11/2012 | Brandt et al. | |
| 2013/0159729 A1 | 6/2013 | Thom et al. | |
| 2013/0227281 A1 | 8/2013 | Kounga et al. | |

OTHER PUBLICATIONS

European Extended Search Report issued in European Application No. 13894614.0, dated Feb. 2, 2017, 9 pages.

\* cited by examiner

PROTECTION SCHEME FOR REMOTELY-STORED DATA

TECHNICAL FIELD

The present disclosure relates to data security, and more particularly, to a scheme for protecting the security of data stored on a remote resource such as a cloud storage system.

BACKGROUND

Data management in electronic devices (e.g., computing devices) is evolving towards a more distributed architecture. For example, while data was traditionally stored in persistent memory local to device, data may now be remotely-stored in a remote resource. An example remote resource may be a cloud-based computing solution comprising at least one computing device (e.g., a server) accessible via a wide-area network (WAN) such as the Internet. There are a variety of benefits that may be realized when using remotely-stored data architectures. For example, data may be accessible not only to the device that generated the data, but also to other devices (e.g., mobile computing devices, mobile communication devices, etc.) that may benefit from being able to access the data regardless of location. The other devices may access data on the remote resource via wired or wireless connections to the Internet. Moreover, remotely-stored data may be much more tolerant of catastrophic events such as fires, weather emergencies, power outages, etc., since cloud-based resources are often built to account for such events with more substantial event protection, backup resources, etc.

While the benefits of remotely-stored data may be apparent, there are also some risks. For example, users storing a variety of data (e.g., that may comprise confidential information) in a single location presents an enticing target for hackers that may have malicious intentions. Encrypting the data prior to storage on the remote resource may help to prevent hackers from gaining access, however, the tools used to perform the encryption must also be protected. For example, when a user is responsible for encrypting data prior to storage on a remote resource, rootkits and other high-privilege attacks may be able to gain access to encryption keys stored on the device of the user. Moving responsibility for data encryption to the remote resource (e.g., cloud-based storage provider) does not alleviate this problem as the same type of attack may be used to access the encryption keys stored in the remote resources (e.g., on a server).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to a protection scheme for remotely-stored data. An example system may comprise at least one device including at least one virtual machine. The at least one virtual machine may be to process data, which may include the storage of data on a remote resource. In this regard, the at least one device may also include a trusted execution environment in which an encryption service may execute. The encryption service may be to encrypt or decrypt data received from the at least one virtual machine. In one embodiment, the at least one virtual machine may include an encryption agent. The encryption agent may be to provide data to the encryption service for encryption or decryption. For example, the encryption agent may register with the encryption service, at which time an encryption key corresponding to the at least one virtual machine may be generated. After verifying that the encryption agent is already registered, the encryption service may utilize the encryption key corresponding to the at least one virtual machine to encrypt or decrypt the data received from the encryption agent, and then return the encrypted or decrypted data to the encryption agent.

In one embodiment, at least one device may comprise, for example, at least one virtual machine and a trusted execution environment. The at least one virtual machine may be to process data in the at least one device. The trusted execution environment may include at least an encryption service to encrypt or decrypt data provided to the encryption service from the at least one virtual machine.

In the same or a different embodiment, the at least one virtual machine may comprise an encryption agent to provide the data to the encryption service. The encryption service may comprise, for example, at least an encryption interface and a decryption interface to interact with the encryption agent. The encryption service may further be to register the encryption agent prior to accepting data for encryption or decryption from the at least one virtual machine. The trusted execution environment may further comprise an encryption key corresponding to the at least one virtual machine, the encryption key being generated by the encryption service when the encryption agent is registered. To protect at least the encryption service and the encryption key, consistent with the present disclosure the trusted execution environment may be based on secure enclave technology. The encryption service may also be to use the encryption key to encrypt or decrypt the data provided by the encryption agent.

In the same or a different embodiment, the at least one device may further comprise a communication module to transmit encrypted data to, and receive encrypted data from, a remote resource. The remote resource may comprise, for example, a plurality of networked computing devices accessible via at least a wide-area network, the plurality of networked computing devices comprising at least a memory module to store encrypted data. In an alternative configuration, the at least one device may comprise a plurality of networked computing devices accessible via at least a wide-area network, the plurality of network computing devices further comprising at least a memory module to store encrypted data. An example method consistent with at least one embodiment of the present disclosure may comprise receiving data from at least one virtual machine at an encryption service executing within a trusted execution environment, encrypting or decrypting the received data in the encryption service and providing the encrypted or decrypted data to the at least one virtual machine.

Figure 1:
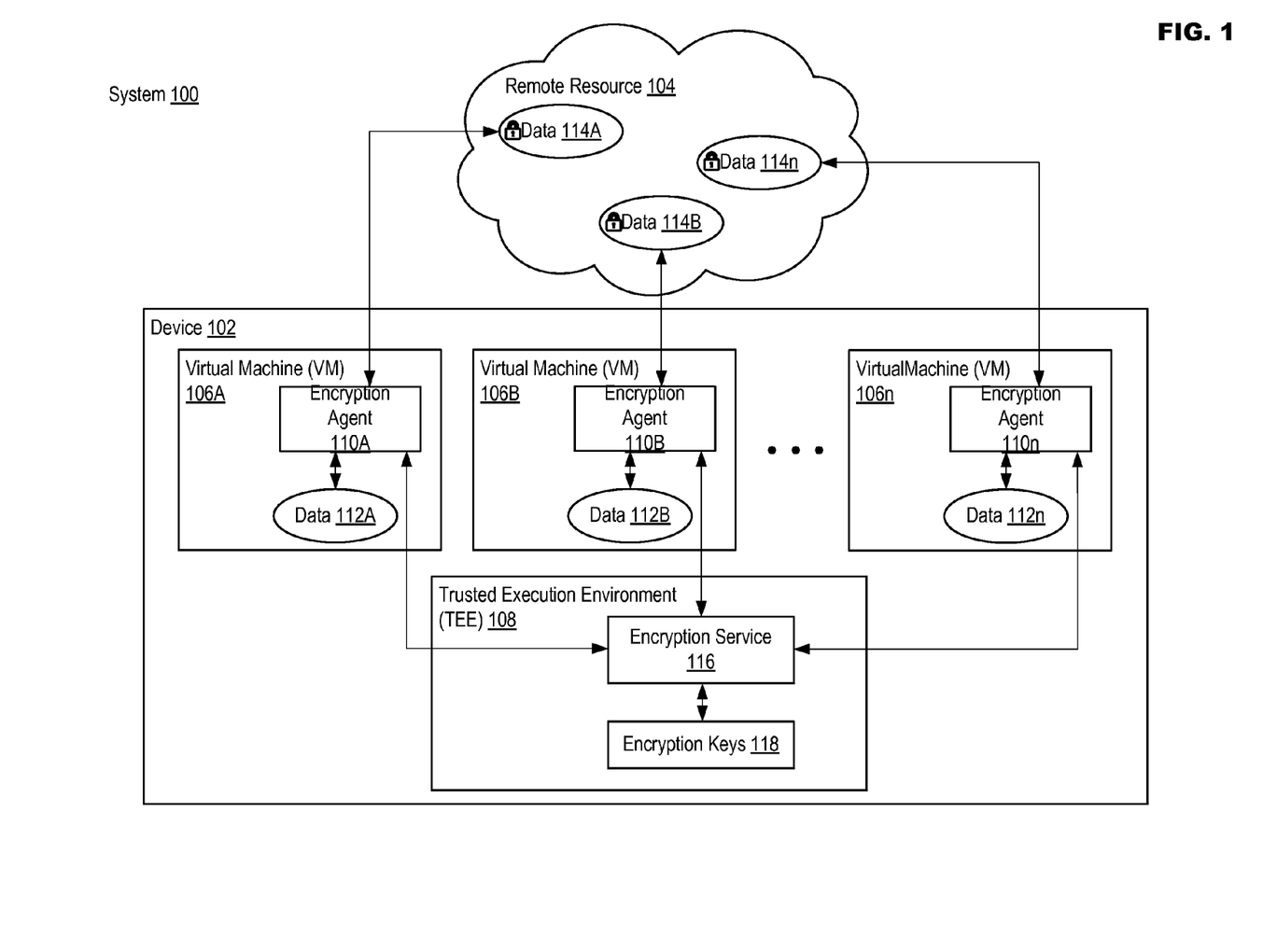
FIG. 1 illustrates an example configuration for a protection scheme for remotely-stored data in accordance with at least one embodiment of the present disclosure.

FIG. 1 illustrates an example configuration for a protection scheme for remotely-stored data in accordance with at least one embodiment of the present disclosure. System 100 may comprise, for example, device 102 and remote resource 104. Device 102 may comprise any device including resources capable of processing and storing data. Examples of device 102 may include, but are not limited to, a mobile communication device such as a cellular handset or a smartphone based on the Android® OS, iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, smart watch etc., a typically stationary computing device such as a desktop computer, a set-top device, a smart television (TV), an audio and/or video electronic conferencing system, etc. Remote resource 104 may comprise, for example, at least one computing device (e.g., a server) accessible via a WAN like the Internet (e.g., a "cloud-based" data storage solution). It is important to note that, while FIG. 1 discloses only a single device 102 interacting with remote resource 104, consistent with the present disclosure it is possible for more than one device 102 (e.g., a plurality of devices) to interact concurrently with remote resource 104.

Device 102 may comprise, for example, at least one virtual machine (VM) 102 and trusted execution environment (TEE) 106A. VM 106 may be a software-based abstraction of hardware in a computing device that is presented to an application layer in device 102. Thus, VM 106A, VM 106B . . . VM 106n (hereafter VM 106A . . . n) may each operate as an individual computing device within device 102. A virtual machine manager (VMM) or "hypervisor" in device 102 may monitor and control the operation of VM 106A . . . n. TEE 108 may comprise a secure workspace in device 102 in which known-good programs may execute, confidential information may be stored in a secure manner, etc. For example, TEE 108 may be based on Secure Enclave technology developed by the Intel Corporation. SE may provide a safe and hardware-encrypted computation and storage area inside of system memory, the contents of which cannot be deciphered by privileged code or even through the application of hardware probes to memory bus. When TEE 108 resides within an SE, embodiments consistent with the present disclosure make it impossible for an intruder to decipher the contents of TEE 108.

For example, SE may be visualized as a virtual safe for protecting applications, data, etc. An application developer may specify the memory region that must be protected, which creates the safe. At this point there is a safe available, but nothing of value is stored inside. The application developer may then place code into the protected memory region and may initialize any necessary data. At this point the code and data have been placed inside of the safe, but nothing is secret yet as anyone may have observed what was placed into the safe because "the safe door" is still open. The application may then initialize the SE, which may be considered as the equivalent of closing and locking the door of the safe. From this point forward the enclave code may execute only inside of the safe and running code inside this enclave may generate secure keys (e.g., protected data). Protected data values cannot be observed outside of the SE, and thus, the code and data is inaccessible outside of the SE.

In an example implementation wherein TEE 108 resides within an SE, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE 108. For example, known-good programs in TEE 108 may encrypt data such as keys, passwords, licenses, etc. so that only verified good programs may decrypt this information. While only one TEE 108 is disclosed in device 102, it is also possible for a plurality of TEEs 108 to exist. The use of a plurality of TEEs 108 may increase security in device 102 in that if one TEE 108 is compromised the security of the remaining separate TEEs 108 remains intact.

VM 106A . . . n may each comprise an encryption agent 110A, 110B . . . 110n (hereafter encryption agent 110 A . . . n). Encryption agent 110A . . . n may be responsible for interacting with encryption service 116 in 116. Interaction may include, for example, providing data to encryption service 116 for encryption or decryption. Consistent with the example virtualized environment discussed above, encryption service 116 may be included as a component of the hypervisor. Alternatively, in a non-virtualized environment encryption service 116 may be a secure module residing in the OS of device 102 configured to perform data encryption and decryption for applications executing in the OS. At least one objective consistent with the present disclosure is to ensure that all data stored by VM 106A . . . n in remote resource 104 is encrypted in a manner so that both the data and the tools used for encryption/decryption (e.g., encryption programs and keys) are protected from unauthorized access. In this regard, encryption service 116 may comprise measured (e.g., known-good) programs for encrypting data to be stored in remote resource 104, or for decrypting encrypted data retrieved from remote resource 104. In an example of operation for encrypting data to be placed on remote resource 104, encryption agent 110A may provide data 112A to encryption service 116. In one embodiment, encryption service 116 may comprise at least two interfaces such as, for example, application programming interfaces (APIs) to accept data to be encrypted or to accept data to be decrypted. Encryption service 116 may then utilize an encryption key 118 to encrypt the data (e.g., converting it to encrypted data 114A). Encrypted data 114A may then be returned to encryption agent 110A. VM 106A may then cause encrypted data 114A to be stored (e.g., encrypted data 114A may be sent to remote resource 104 for storage). The above example operation may also operate in reverse, wherein VM 106A obtains encrypted data 114A from remote resource 104 and provides it to encryption service 116 for decryption.

In one embodiment, Encryption keys 118 may include encryption keys corresponding to each VM 106A . . . n. Encryption keys 118 may be protected by being generated and stored all within TEE 108. This means that the generation of encryption keys 118 may be through a measured program (e.g., encryption service 116) and encryption keys 118 may be stored in an encrypted format that may only be decrypted by measured programs. In one embodiment, the generation of encrypted keys may take place when each encryption agent 110A . . . n registers with encryption service 116. A secure channel between client applications (e.g., encryption agent 110A . . . n) and encryption service 116 may be used to ensure that only authenticated client applications may request data encryption or decryption from encryption service 116. Registration may take place after each encryption agent 110 . . . n is initiated in VM 106A . . . n, and may include an authentication of encryption agent 110A . . . n. Authentication may include encryption agent 110A . . . n providing information to encryption service 116 such as hash values for measuring known-good programs, ephemeral keys for use in a key exchange protocol or a Challenge-Handshake Authentication Protocol (CHAP), etc. After each encryption agent 110A . . . n is registered, encryption service 116 may generate an encryption key 118 for the VM 106A . . . n in which encryption agent 110A . . . n is operating. In at least one embodiment, encryption keys 118 may also be capable of being migrated between computing devices (e.g., servers) making up remote resources 104 (e.g., for Information Technology as a Service (ITaaS) or Infrastructure as a Service (IaaS)-type deployments).

Figure 2:
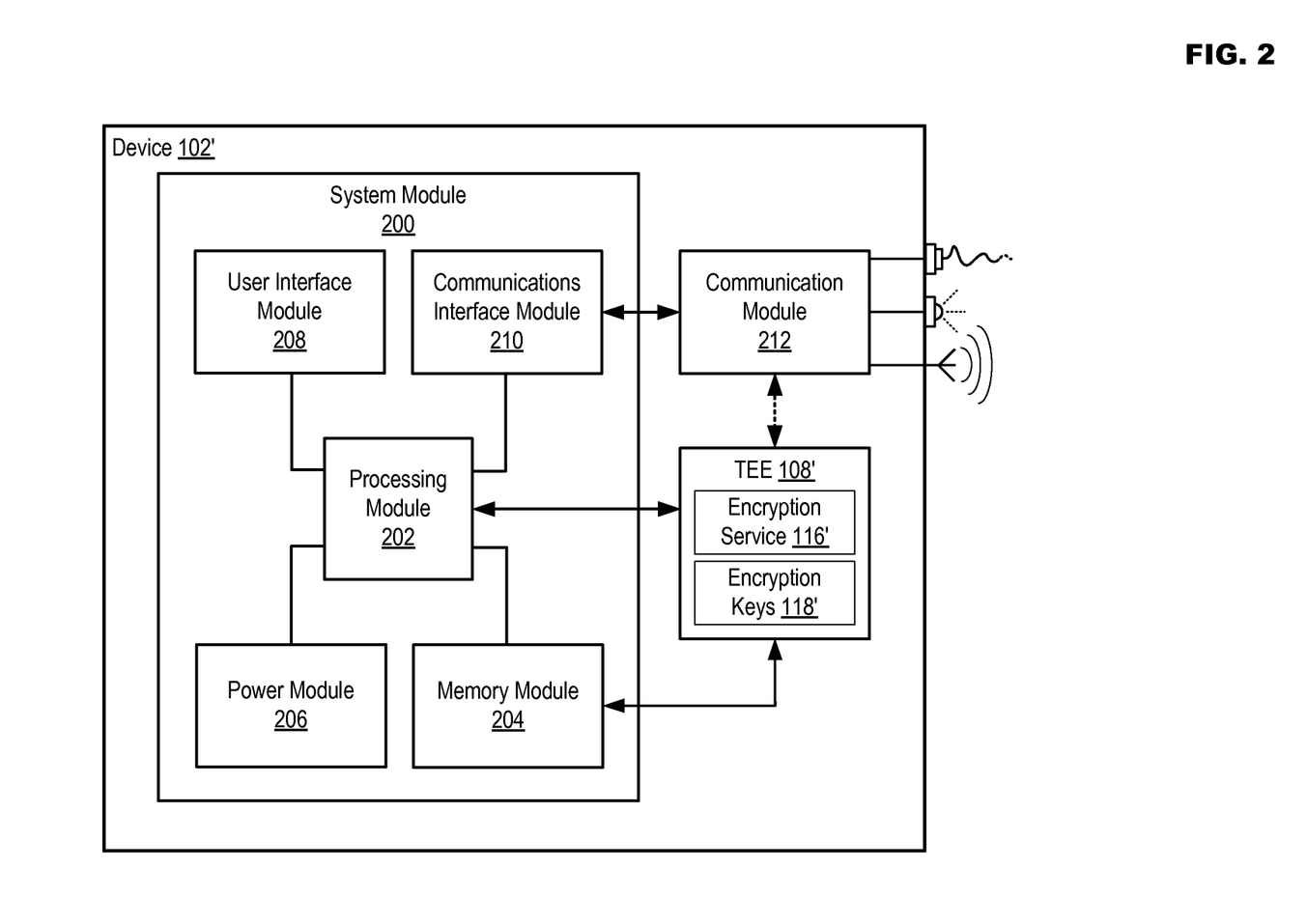
FIG. 2 illustrates an example configuration for a device in accordance with at least one embodiment of the present disclosure.

FIG. 2 illustrates an example configuration for a device in accordance with at least one embodiment of the present disclosure. In particular, device 102' may be able to perform example functionality such as disclosed in FIG. 1. However, device 102' is meant only as an example of equipment usable in embodiments consistent with the present disclosure, and is not meant to limit these various embodiments to any particular manner of implementation.

Device 102' may comprise system module 200 configured to manage device operations. System module 200 may include, for example, processing module 202, memory module 204, power module 206, user interface module 208 and communication interface module 210 that may be configured to interact with communication module 212. Device 102' may also include TEE 108' to interact with at least processing module 202, memory module 204 and optionally with communication module 212. While communication module 212 and TEE 108' have been shown separately from system module 200, the example implementation of device 102' has been provided merely for the sake of explanation herein. Some or all of the functionality associated with communication module 212 and/or TEE 108' may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as Bios or Unified Extensible Firmware Interface (UEFI) memory configured to provide instructions when device 102' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 102' with the power needed to operate.

User interface module 208 may include equipment and/or software to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within device 102' and/or may be coupled to device 102' via a wired or wireless communication medium.

Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, TEE 108' may be configured to interact with at least user processing module 202, memory module 203 and optionally with communication module 212. In an example of operation, VM 106A . . . n residing in memory module 204 may each comprise encryption agent 110A . . . n being executed by processing module 202. Any of encryption agent 110A . . . n may provide data to encryption service 116' in TEE 108' via, for example, an interface. Encryption service 116' may access encryption keys 118' to encrypt or decrypt data provided by encryption agent 110A . . . n. In one embodiment, encryption service 116' may then return the encrypted or decrypted data to encryption agent 106A . . . n. In an alternative configuration, encryption service 116' may interact with communication module 212 to directly transmit and receive encrypted data 114A . . . n from remote resource 104. Thus, VM 106A . . . n would no longer interact directly with remote resource 104, which may improve system security by reducing the overall interaction with remote resource 104. Example interactions may then include encryption agent 110A requesting that encryption service 116' both encrypt data 112A and store encrypted data 114A in remote resource 104, or that encryption service 116' both retrieve encrypted data 114A from remote resource 104 and then decrypt encrypted data 114A into decrypted data 112A for use by VM 106A.

Figure 3:
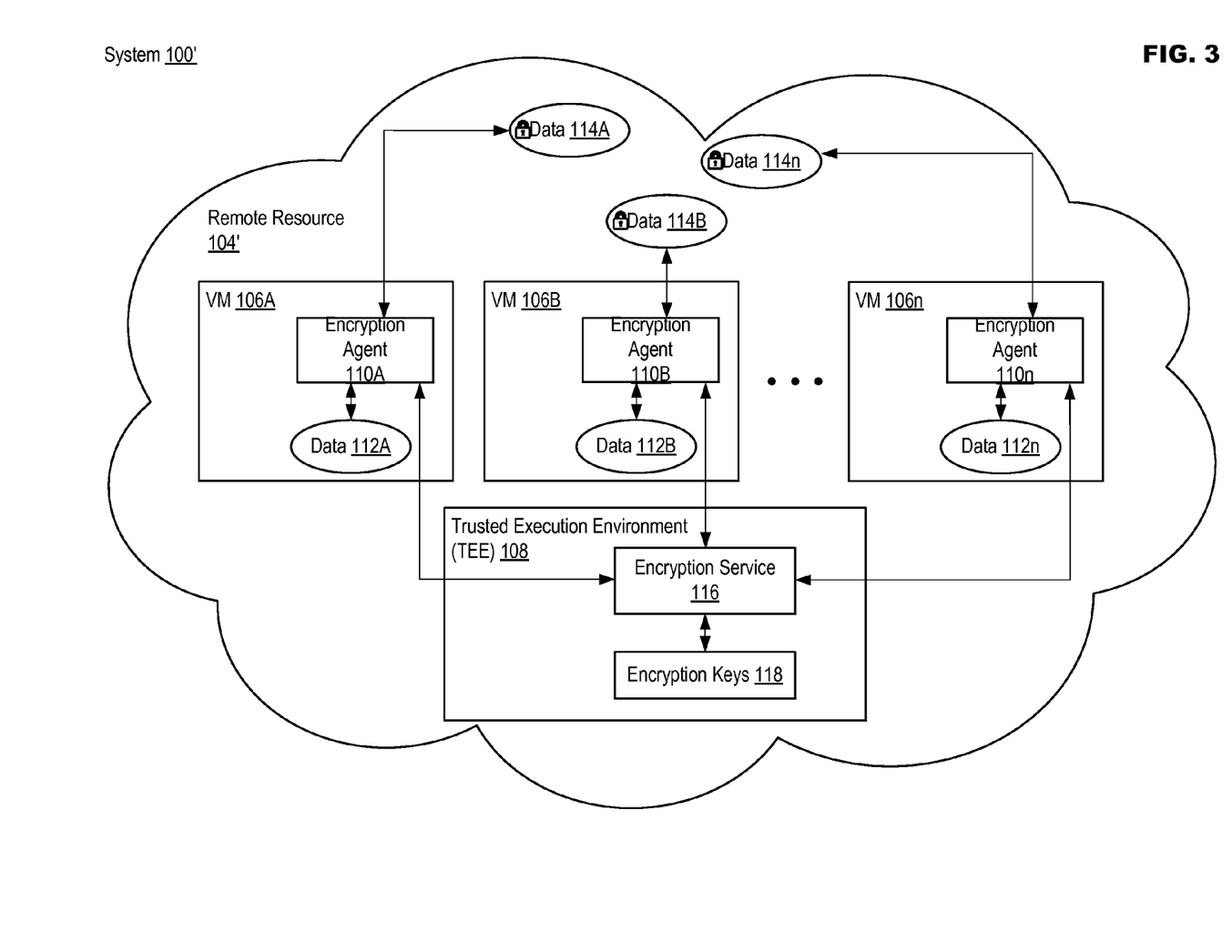
FIG. 3 illustrates a second example configuration for a protection scheme for remotely-stored data in accordance with at least one embodiment of the present disclosure.

FIG. 3 illustrates a second example configuration for a protection scheme for remotely-stored data in accordance with at least one embodiment of the present disclosure. FIG. 3 demonstrates that it may be possible for the functionality associated with device 102 in FIG. 1 to be incorporated into remote resource 104'. In system 100' the encryption and decryption of data is performed entirely within remote resource 104', thereby ensuring the security of encrypted data 104' and encryption keys 118 while simultaneously reducing the processing burden on a device consuming data 112A . . . n. This type of implementation may be beneficial in situations where, for example, the consuming devices have limited resources (e.g., limited processing ability, storage space, power, etc.) such as in a mobile computing device or a mobile communication device. The bulk of the data processing involved with encryption/decryption may then be moved remote resource 104' (e.g., a cloud-based storage solution) to reduce burden for the consuming device. At least one liability in system 100' is that decrypted data 112A . . . n is exchanged between remote resource 104' and the consuming device, making data interception a possibility (e.g., such as in a man-in-the-middle attack).

Figure 4:
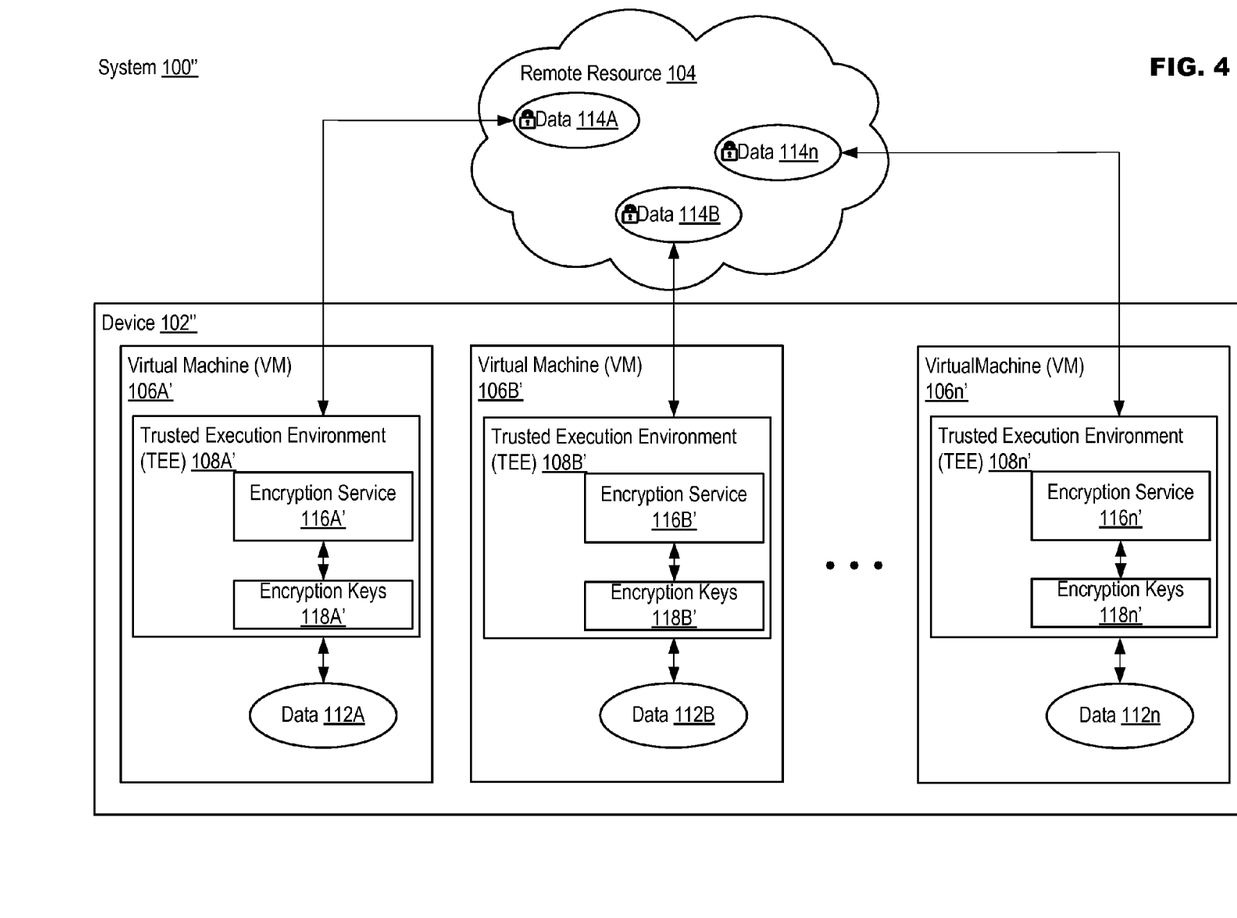
FIG. 4 illustrates a third example configuration for a protection scheme for remotely-stored data in accordance with at least one embodiment of the present disclosure.

FIG. 4 illustrates a third example configuration for a protection scheme for remotely-stored data in accordance with at least one embodiment of the present disclosure. System 100" may comprise at least device 102" and remote resources 104. Device 102" may comprise VM 106A' . . . n', wherein each VM 106A' . . . n' may include a separate TEE 108 (e.g., TEE 108A' . . . n'). Each separate TEE 108A' . . . n' may include a corresponding encryption service 116A' . . . n' and encryption keys 118A' . . . n. In general, system 100" may be considered a "distributed" solution wherein each VM 106A' . . . n' includes its own secure data encryption/decryption resources (e.g., encryption service 116' A . . . n and encryption keys 118' A . . . n in TEE 108A' . . . n') for protecting data 114A . . . n. The need for encryption agent 110A . . . n has been eliminated in system 100" since data 112A . . . n may be submitted directly to each individual encryption service 116A' . . . n'. In addition to reducing the communication burden by eliminating the interaction between the encryption agent and service, system 100" may be more robust than other implementations in that problems experienced by any of TEE 108A' . . . n' will not affect the performance of the remaining TEE 108A' . . . n'. In this manner, traffic and other throughput problems may be localized to particular VM 106A' . . . n' that are experiencing heavy loading, along with the malfunction or corruption of any TEE 108A' . . . n'. However, the potential for improved data flow, fault tolerance, etc. may necessitate increased system complexity to maintain separate secure encryption resources for each VM 106A' . . . n'.

Figure 5:
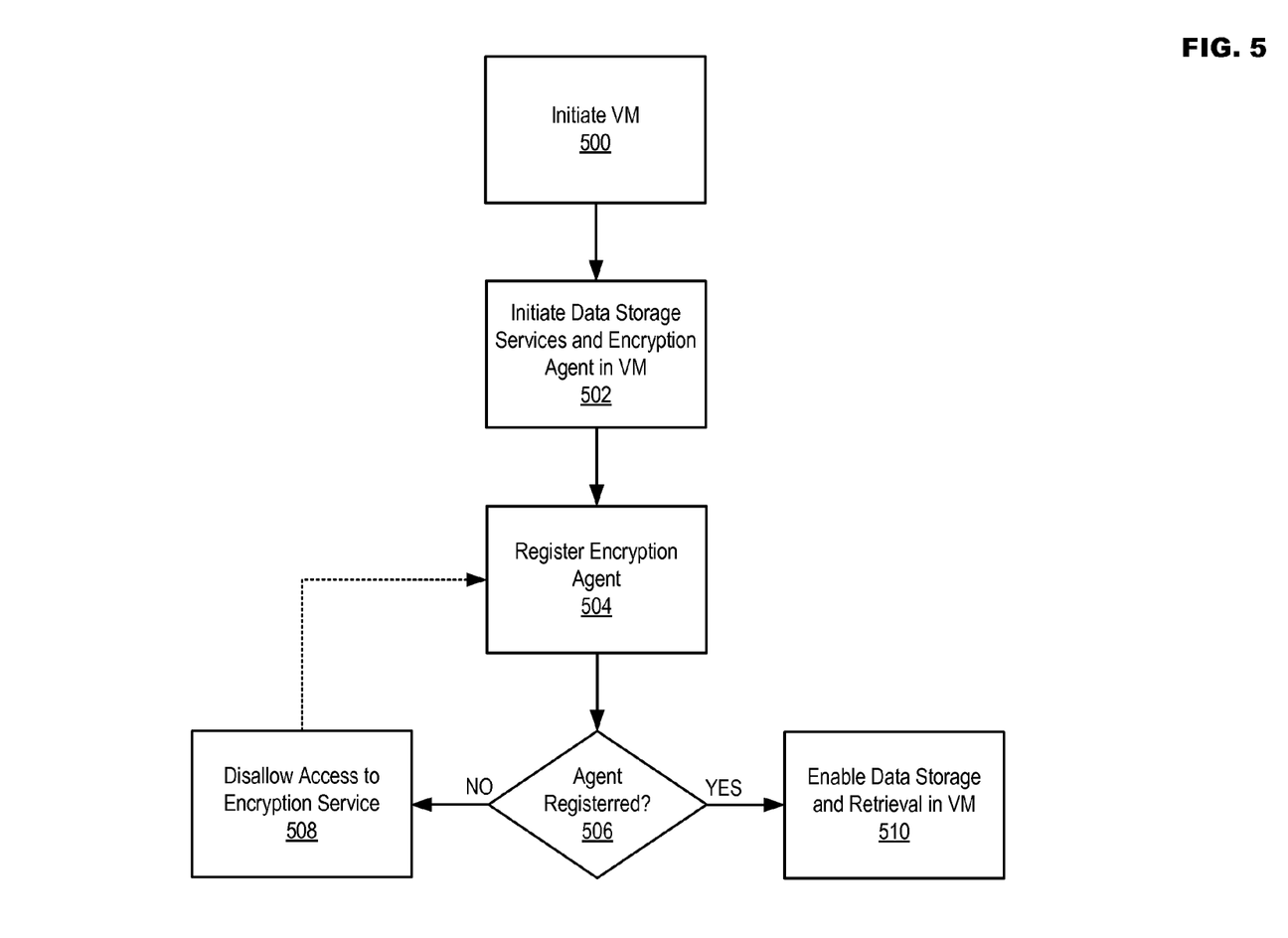
FIG. 5 illustrates example operations for virtual machine initiation in accordance with at least one embodiment of the present disclosure.

FIG. 5 illustrates example operations for virtual machine initiation in accordance with at least one embodiment of the present disclosure. A VM may be initiated in operation 500. The VM may reside in a device separate from a remote resource where data may be stored (e.g., as in system 100) or may reside in the remote resource (e.g., as in system 100'). The initiation of the VM may be followed by the initiation of data storage services and an encryption agent in operation 502. Data storage services may be any functionality that may result in the storage of data in the remote resource. Examples of data storage services may include, but are not limited to, backup functionality to create copies of locally-stored data in the remote resource, database functionality to store information generated by user interaction, archiving functionality to store automatically logged information for use in issue resolution, etc. Following encryption agent initiation in operation 502, registration of the encryption agent may then take place in operation 504. Encryption agent 504 may attempt to register with an encryption service within a TEE in the device by providing verification information (e.g., measurement information, keys, etc.) to the encryption service. A determination may then be made in operation 506 as to whether the encryption agent was successfully registered with the encryption service. If it is determined in operation 506 that agent registration failed, then in operation 508 access may be disallowed to the encryption service for the VM (e.g., the encryption service will not encrypt or decrypt data for the VM corresponding to the encryption agent that failed registration. Optionally, operation 508 may be followed by a return to operation 504 to reattempt registration. If it is determined in operation 506 that registration was successful, then in operation 510 data storage and retrieval may be enabled for the VM corresponding to the encryption agent that passed registration. This means the encryption service will respond to encryption/decryption requests from the encryption agent.

Figure 6:
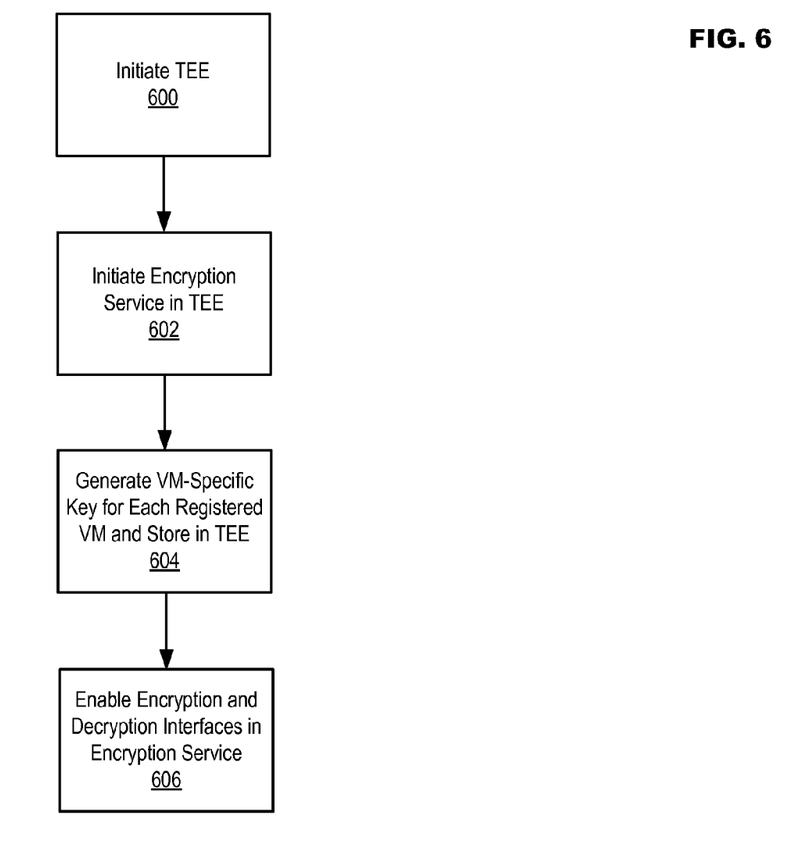
FIG. 6 illustrates example operations for encryption service initiation in accordance with at least one embodiment of the present disclosure.

FIG. 6 illustrates example operations for encryption service initiation in accordance with at least one embodiment of the present disclosure. In operation 600, a TEE may be initiated in a device. For example, during boot a trusted program may boot and measure all subsequent programs that are part of the TEE. One of the programs that may be measured upon launch is an encryption service in operation 602. Following initiation of the encryption service, encryption agents operating in VMs on the device may register with the encryption service in operation 604. An encryption key corresponding to a VM may be generated by the encryption service for each encryption agent that is successfully registered. The encryption keys corresponding to each VM with a registered encryption agent may then be stored (e.g., in encrypted form) within the TEE. In operation 606, encryption and decryption interfaces may be enabled in the encryption service, allowing registered encryption agents to request encryption or decryption from the encryption service (e.g., utilizing the encryption keys).

Figure 7:
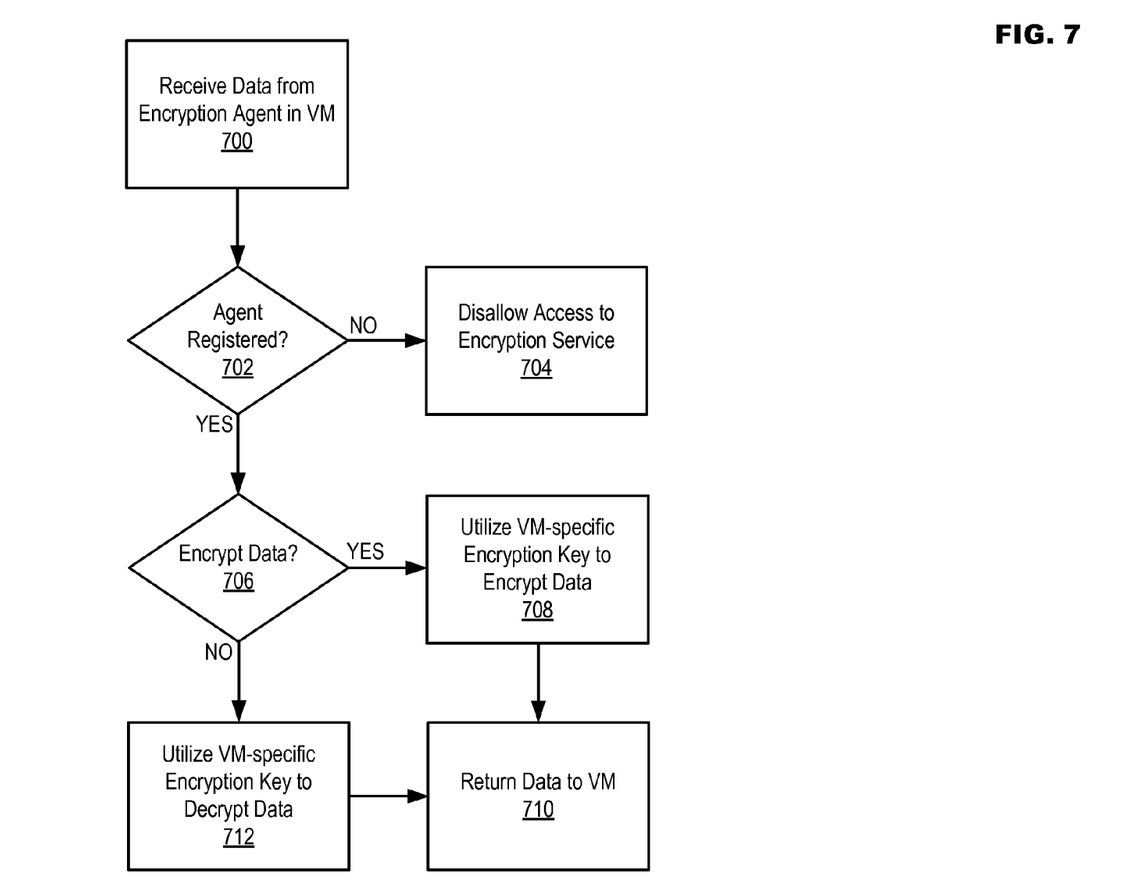
FIG. 7 illustrates example operations for a protection scheme for remotely-stored data in accordance with at least one embodiment of the present disclosure.

FIG. 7 illustrates example operations for a protection scheme for remotely-stored data in accordance with at least one embodiment of the present disclosure. In operation 700, data may be received in an encryption service operating within a TEE in a device. The data may be received from an encryption agent operating within a VM in the device. A determination may then be made in operation 702 as to whether the encryption agent is already registered with the encryption service. If in operation 702 it is determined that the encryption agent is not registered, then in operation 704 access to the encryption service may be disallowed for the particular encryption agent. Alternatively, if in operation 702 it is determined that the encryption agent is registered, then in operation 706 a determination may be made as to whether the data being provided to the encryption service requires encryption (e.g., prior to storage on a remote resource). The determination in operation 706 may be based on, for example, an interface in the encryption service used by the encryption agent to submit the data. If in operation 706 it is determined that the data requires decryption, then in operation 708 an encryption key corresponding to the VM on which the encryption agent is operating may be used to encrypt the data. The encrypted data may then be returned to the encryption agent that originally provided the data in operation 710. If in operation 706 it is determined that the data provided by the encryption agent does not require encryption (e.g., the data requires decryption), then in operation 712 the encryption key corresponding to the VM on which the encryption agent is operating may be used to decrypt the data. Operation 612 may then be followed by a return to operation 710, wherein the decrypted data may be returned to the encryption agent that originally provided the data.

While FIGS. 5 to 7 illustrates operations according to different embodiments, it is to be understood that not all of the operations depicted in FIGS. 5 to 7 are necessary for other embodiments. Indeed, it is fully contemplated herein that in other embodiments of the present disclosure, the operations depicted in FIGS. 5 to 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a protection scheme for remotely-stored data. A system may comprise, for example, at least one device including at least one virtual machine (VM) and a trusted execution environment (TEE). The TEE may include an encryption service to encrypt or decrypt data received from the at least one VM. In one embodiment, the at least one VM may include an encryption agent to interact with interfaces in the encryption service. For example, the encryption agent may register with the encryption service, at which time an encryption key corresponding to the at least one VM may be generated. After verifying the registration of the encryption agent, the encryption service may utilize the encryption key corresponding to the at least one VM to encrypt or decrypt data received from the encryption agent. The encryption service may then return the encrypted or decrypted data to the encryption agent.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for a protection scheme for remotely-stored data, as provided below.

Example 1

According to this example there is provided a device including at least one virtual machine to process data in the at least one device and a trusted execution environment including at least an encryption service to encrypt or decrypt data provided to the encryption service from the at least one virtual machine.

Example 2

This example includes the elements of example 1, wherein at least one virtual machine comprises an encryption agent to provide the data to the encryption service.

Example 3

This example includes the elements of example 2, wherein the encryption service comprises at least an encryption interface and a decryption interface to interact with the encryption agent.

Example 4

This example includes the elements of any of examples 2 to 3, wherein the encryption service is further to register the encryption agent prior to accepting data for encryption or decryption from the at least one virtual machine.

Example 5

This example includes the elements of example 4, wherein registration comprises authenticating at least one of identification information, program verification information or at least one key provided by the encryption agent.

Example 6

This example includes the elements of any of examples 4 to 5, wherein the trusted execution environment further comprises an encryption key corresponding to the at least one virtual machine, the encryption key being generated by the encryption service when the encryption agent is registered.

Example 7

This example includes the elements of example 6, wherein the trusted execution environment is based on secure enclave technology to protect at least the encryption service and encryption key.

Example 8

This example includes the elements of any of examples 6 to 7, wherein the encryption service is to use the encryption key to encrypt or decrypt the data provided by the encryption agent.

Example 9

This example includes the elements of any of examples 1 to 8, further comprising a communication module to transmit encrypted data to, and receive encrypted data from, a remote resource.

Example 10

This example includes the elements of example 9, wherein the remote resource comprises a plurality of networked computing devices accessible via at least a wide-area network, the plurality of networked computing devices comprising at least a memory module to store encrypted data.

Example 11

This example includes the elements of any of examples 1 to 10, wherein the at least one device comprises a plurality of networked computing devices accessible via at least a wide-area network, the plurality of network computing devices further comprising at least a memory module to store encrypted data.

Example 12

This example includes the elements of any of examples 1 to 11, wherein the at least one device comprises a plurality of virtual machines, each of the plurality of virtual machines comprising a separate trusted execution environment including at least an encryption service.

Example 13

This example includes the elements of any of examples 1 to 12, further comprising a communication module to transmit encrypted data to, and receive encrypted data from, a remote resource comprising a plurality of networked computing devices accessible via at least a wide-area network, the plurality of networked computing devices comprising at least a memory module to store encrypted data.

Example 14

This example includes the elements of any of examples 1 to 13, wherein the at least one device comprises a mobile communication device.

Example 15

This example includes the elements of any of examples 1 to 13, wherein the at least one device comprises a mobile computing device.

Example 16

This example includes the elements of any of examples 1 to 13, wherein the at least one device comprises a typically stationary computing device.

Example 17

According to this example there is provided a method including receiving data from at least one virtual machine at an encryption service executing within a trusted execution environment, encrypting or decrypting the received data in the encryption service and providing the encrypted or decrypted data to the at least one virtual machine.

Example 18

This example includes the elements of example 17, wherein the data is received via at least one of an encryption interface or a decryption interface in the encryption service.

Example 19

This example includes the elements of any of examples 17 to 18, further comprising initiating the trusted execution environment in at least one device and initiating the encryption service within the trusted execution environment.

Example 20

This example includes the elements of any of examples 17 to 19, further comprising receiving a request in the encryption service to register an encryption agent in the at least one virtual machine, determining whether to register the encryption agent based at least on information provided in the request and if it is determined that the encryption agent should be registered, registering the encryption agent in the encryption service.

Example 21

This example includes the elements of example 20, wherein determining whether to register the encryption agent comprises authenticating at least one of identification information, program version information or at least one key provided by the encryption agent.

Example 22

This example includes the elements of any of examples 20 to 21, further comprising generating an encryption key corresponding to the at least one virtual machine in the trusted execution environment based on the registering of the encryption agent.

Example 23

This example includes the elements of example 22, wherein the trusted execution environment is based on secure enclave technology to protect at least the encryption service and encryption key.

Example 24

This example includes the elements of any of examples 22 to 23, wherein encrypting or decrypting the received data comprises determining if the encryption agent in the at least one virtual machine from which the data was received is registered prior to encrypting or decrypting the received data.

Example 25

This example includes the elements of example 9, further comprising, if the encryption agent is determined to be registered, encrypting or decrypting the received data using the encryption key.

Example 26

This example includes the elements of any of examples 17 to 25, further comprising receiving a request in the encryption service to register an encryption agent in the at least one virtual machine, determining whether to register the encryption agent based at least on information provided in the request, if it is determined that the encryption agent should be registered, registering the encryption agent in the encryption service and generating an encryption key corresponding to the at least one virtual machine in the trusted execution environment based on the registering of the encryption agent.

Example 27

This example includes the elements of example 26, wherein encrypting or decrypting the received data comprises determining if the encryption agent in the at least one virtual machine from which the data was received is registered prior to encrypting or decrypting the received data, and if the encryption agent is determined to be registered, encrypting or decrypting the received data using the encryption key.

Example 28

According to this example there is provided a system including at least one device, the system being arranged to perform the method of any of the examples 17 to 27.

Example 29

According to this example there is provided a chipset arranged to perform the method of any of the examples 17 to 27.

Example 30

According to this example there is provided at least one machine readable medium comprising a plurality of instructions that, in response to be being executed on a computing device, cause the computing device to carry out the method according to any of the examples 17 to 27.

Example 31

According to this example there is provided at least one device configured for a protection scheme for remotely-stored data, the device being arranged to perform the method of any of the examples 17 to 27.

Example 32

According to this example there is provided a device having means to perform the method of any of the examples 17 to 27.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. At least one device, comprising:
processing circuitry; and
memory circuitry including at least one unsecured region into which the processing circuitry is to load a plurality of virtual machines to process data in the at least one device; and
a trusted execution environment including at least an encryption service authenticated by the trusted execution environment, wherein the encryption service is to encrypt or decrypt data provided to the encryption service from the plurality of virtual machines using an encryption key generated specifically for each of the one or more virtual machines, the encryption keys being stored in an encrypted format decryptable by the authenticated encryption service: wherein the plurality of virtual machine each comprise an encryption agent to provide decrypted or encrypted data to the encryption service, receive decrypted or encrypted data from the encryption service and cause the at least one device to transmit encrypted data to, or receive encrypted data from, a remote resource; and wherein the encryption service is further to register each encryption agent prior to accepting data for encryption or decryption from the plurality of virtual machines.

2. The at least one device of claim 1, wherein the encryption service comprises at least an encryption interface and a decryption interface to interact with the encryption agent.

3. The at least one device of claim 1, wherein the trusted execution environment further comprises encryption keys corresponding to each of the plurality of virtual machines, the encryption keys being generated by the encryption service when each encryption agent is registered.

4. The at least one device of claim 3, wherein the trusted execution environment is based on secure enclave technology to protect at least the encryption service and encryption keys.

5. The at least one device of claim 3, wherein the encryption service is to use the encryption keys to encrypt or decrypt the data provided by the encryption agents.

6. The at least one device of claim 1, further comprising communication circuitry to transmit encrypted data to, and receive encrypted data from, the remote resource comprising a plurality of networked computing devices accessible via at least a wide-area network, the plurality of networked computing devices comprising at least memory circuitry to store encrypted data.

7. The at least one device of claim 1, wherein the at least one device comprises a plurality of networked computing devices accessible via at least a wide-area network, the plurality of network computing devices further comprising at least the memory circuitry to store encrypted data.

8. The at least one device of claim 1, wherein each of the plurality of virtual machines comprises a separate trusted execution environment including at least an encryption service.

9. A method, comprising:
receiving requests in an encryption service authenticated by and executing within a trusted execution environment in at least one device to register encryption agents in each of a plurality of virtual machines loaded into at least one unsecured region in memory circuitry in the at least one device;
determining whether to register the encryption agents based at least on information provided in the requests;
if it is determined that the encryption agents should be registered, registering the encryption agents in the encryption service;
receiving, at the encryption service, data from at least one encryption agent in the plurality of encryption agents;
determining if the at least one encryption agent is registered;
if the at least one encryption agent is determined to be registered:
decrypting a key corresponding to the virtual machine in which the at least one encryption agent is executing, the key being decrypted by the authenticated encryption service;
encrypting or decrypting the received data in the encryption service using the key; and
providing the encrypted or decrypted data to the at least one encryption agent.

10. The method of claim 9, further comprising:
initiating the trusted execution environment in at least one device; and
initiating the encryption service within the trusted execution environment.

11. The method of claim 9, further comprising:
generating encryption keys corresponding to each of the plurality of virtual machines in the trusted execution environment based on the registering of each encryption agent.

12. The method of claim 11, wherein the trusted execution environment is based on secure enclave technology to protect at least the encryption service and encryption keys.

13. The method of claim 11, further comprising:
if the at least one encryption agent is determined to be registered, encrypting or decrypting the received data using the corresponding encryption key.

14. At least one non-transitory machine-readable storage medium having stored thereon, individually or in combination, instructions that when executed by one or more processors result in the following operations comprising:
receiving requests in an encryption service authenticated by and executing within a trusted execution environment in at least one device to register encryption agents in each of a plurality of virtual machines loaded into at least one unsecured region in memory circuitry in the at least one device;
determining whether to register the encryption agents based at least on information provided in the requests;
if it is determined that the encryption agents should be registered, registering the encryption agents in the encryption service;
receiving, at the encryption service, data from at least one encryption agent in the plurality of encryption agents;
determining if the at least one encryption agent is registered;
if the at least one encryption agent is determined to be registered:
decrypting a key corresponding to the virtual machine in which the at least one encryption agent is executing, the key being decrypted by the authenticated encryption service;
encrypting or decrypting the received data in the encryption service using the key; and
providing the encrypted or decrypted data to the at least one encryption agent.

15. The medium of claim 14, further comprising instructions that when executed by one or more processors result in the following operations comprising:
initiating the trusted execution environment in at least one device; and
initiating the encryption service within the trusted execution environment.

16. The medium of claim 14, further comprising instructions that when executed by one or more processors result in the following operations comprising:
generating encryption keys corresponding to each of the plurality of virtual machines in the trusted execution environment based on the registering of each encryption agent.

17. The medium of claim 16, wherein the trusted execution environment is based on secure enclave technology to protect at least the encryption service and encryption keys.

18. The medium of claim 14, further comprising instructions that when executed by one or more processors result in the following operations comprising:

if the at least one encryption agent is determined to be registered, encrypting or decrypting the received data using the corresponding encryption key.

\* \* \* \* \*